United States Patent
Liu et al.

(10) Patent No.: US 8,595,861 B2
(45) Date of Patent: Nov. 26, 2013

(54) THERMAL PROBE

(75) Inventors: Bernard HaoChih Liu, Tainan (TW); Fang-Yi Liao, Taichung (TW); Jian-Hong Chen, Nantou County (TW)

(73) Assignee: National Cheng Kung University, Tainan (TW)

( * ) Notice: Subject to any disclaimer, the term of this patent is extended or adjusted under 35 U.S.C. 154(b) by 0 days.

(21) Appl. No.: 13/475,806

(22) Filed: May 18, 2012

(65) Prior Publication Data
US 2013/0019352 A1    Jan. 17, 2013

(30) Foreign Application Priority Data

Jul. 12, 2011  (TW) .............................. 100124684 A

(51) Int. Cl.
*G01Q 60/58*   (2010.01)
(52) U.S. Cl.
CPC ............. G01Q 60/58 (2013.01); *Y10S 977/867* (2013.01)
USPC .......................................... 850/50; 977/867
(58) Field of Classification Search
USPC ........................................... 850/50; 977/867
See application file for complete search history.

(56) References Cited

U.S. PATENT DOCUMENTS

| | | | |
|---|---|---|---|
| 5,929,438 A * | 7/1999 | Suzuki et al. ................... 850/50 |
| 6,566,650 B1 * | 5/2003 | Hu et al. ........................ 250/281 |
| 7,652,972 B2 * | 1/2010 | Nam et al. ..................... 369/126 |
| 7,913,544 B1 * | 3/2011 | Chand ............................. 73/105 |
| 8,214,915 B2 * | 7/2012 | Shigeno et al. ................... 850/5 |

* cited by examiner

*Primary Examiner* — Jack Berman
*Assistant Examiner* — Eliza Osenbaugh-Stewart
(74) *Attorney, Agent, or Firm* — Muncy, Geissler, Olds & Lowe, PLLC

(57) ABSTRACT

A thermal probe includes a support element, a conductive pattern and a tip. The conductive pattern is disposed at the support element and has plural bending portions. The tip has a base and a pinpoint. The base has a first surface and a second surface which is opposite to the first surface. The pinpoint is disposed at the first surface. The second surface is connected with the conductive pattern. The bending portions are contacted with the first surface. The tip of the thermal probe is replaceable, and the user can choose the optimum combination of the tip, conductive pattern and support element according to their needs.

10 Claims, 7 Drawing Sheets

THERMAL PROBE

CROSS REFERENCE TO RELATED APPLICATIONS

This Non-provisional application claims priority under 35 U.S.C. §119(a) on Patent Application No(s). 100124684 filed in Taiwan, Republic of China on Jul. 12, 2011, the entire contents of which are hereby incorporated by reference.

BACKGROUND OF THE INVENTION

1. Field of Invention

The present invention relates to probe and, in particular, to a scanning thermal probe.

2. Related Art

Atomic force microscopy (AFM), also called scanning probe microscopy (SPM), includes the scanning mechanism and operation as well as the fine probe mechanism, so it has become one of the most important instruments in the fields of nano-technology and biomedical research.

FIG. 1 is a schematic diagram showing a scanning probe to detect a sample surface. As shown in FIG. 1, when the surface of a sample 11 is scanned by the probe 12, a light-emitting element 13 outputs a light beam (e.g. a laser) to irradiate a cantilever 121 of the probe 12, and the light beam is reflected and received by a light sensing element 14 (e.g. a photo diode). The control feedback circuit 15 receives the signal transformed by the light sensing element 14 and feeds back to control the movement of a scan mechanism 16 for adjusting the position of the sample 11. Accordingly, the interaction between the tip 122 and the surface of the sample 11 can be maintained at a certain value. The adjustment data for adjusting the position of the sample 11 is referring to the interaction data between the tip 122 and the surface of the sample 11, which is usually corresponding to the surface geography of the sample 11.

The bottleneck of the atomic force microscopy applied to nano-technology and biomedical research is mainly the design and fabrication of new probe. Therefore, the scan probe is the core technique of the atomic force microscopy. In addition, the scanning thermal probe microscopy (SThM) is another technology based on the atomic force microscopy. The different therebetween is that the scanning thermal probe microscopy includes a thermal probe, which can detect the temperature distribution of the sample surface. Due to this novel technology, the scale of thermal analyzing can reach micrometers or sub-micrometers.

However, the scanning thermal probe is usually manufactured by silicon MEMS processes. That is, the tip, heater and cantilever are all made of silicon materials. Although the silicon MEMS processes as well as the quality control thereof are easier, there are still limitations on the tip wearing, effective temperature range of the heater, and the highest measuring temperature. In addition, when using the tip of the thermal probe to scan, the tip and the sample surface can have interaction, which results in the wearing of the tip. If the curvature of the tip increases, the resolution of the image is affected. If the tip must be replaced for providing different functions, the conventional thermal probe does not provide the function for replacing the tip only, so that the entire thermal probe should be replaced. Besides, the conventional tip, heater and cantilever are all made of silicon material, so that the user can not select the optimum combination of the tip, heater and cantilever based on his/her requirement.

Therefore, it is an important subject of the present invention to provide a thermal probe having the replaceable tip, so that the optimum combination of the tip, heater and cantilever can be selected according to the demands.

SUMMARY OF THE INVENTION

In view of the foregoing, an objective of the present invention is to provide a thermal probe having the replaceable tip, so that the optimum combination of the tip, heater and cantilever can be selected according to the demands.

To achieve the above objective, the present invention discloses a thermal probe including a support element, a conductive pattern and a tip. The conductive pattern is disposed at the support element and has plural bending portions. The tip has a base and a pinpoint. The base has a first surface and a second surface which is opposite to the first surface. The pinpoint is disposed at the first surface. The second surface is connected with the conductive pattern. The bending portions are contacted with the first surface.

In one embodiment, the material of the support element comprises silicon.

In one embodiment, the material of the conductive pattern comprises Ni—P alloy, tungsten, platinum, carbon, Ni—Cr alloy, metal oxide, metal nitride, or silicon.

In one embodiment, the material of the tip comprises diamond, TiN, $Si_3N_4$, SiC, ceramic, polymer, complex compound, or their combinations.

In one embodiment, the base and the pinpoint are integrally formed as one piece.

In one embodiment, the tip is replaceable.

In one embodiment, the pinpoint is contact or non-contact with the conductive pattern.

In one embodiment, the conductive pattern is made by the following steps of: coating a photo-resist layer on the support element; forming a pattern by a photolithography process; forming a metal layer; and removing the photo-resist layer and a part of the metal layer out of the pattern so as to form the conductive pattern.

In one embodiment, the thermal probe further includes an adhesive layer disposed on the first surface and/or the second surface.

In one embodiment, the thermal probe further includes a pedestal. The support element is disposed on and protrudes from the pedestal, and the tip is located on one end of the support element away from the pedestal.

As mentioned above, the thermal probe of the present invention includes a support element, a conductive pattern and a tip, the conductive pattern is disposed on the support element and has a plurality of bending portions, the tip has a base and a pinpoint, the base has a first surface and a second surface opposite to each other, the pinpoint is disposed on the first surface, the second surface is connected with the conductive pattern, and the bending portion are contact with the first surface. Accordingly, the bending portions of the conductive pattern can fix the tip, and the length, width and thickness of the metal line of the conductive pattern within the heating area can be modified to adjust the resistance value of the conductive pattern. After applying the current to the conductive pattern 22, the heating area C can generate joule heat for heating the tip 23. Thus, the thermal probe of the present invention can be applied to scanning probe microscopy and other related fields. In addition, the thermal probe of the present invention can select the optimum combination of "tip, conductive pattern and support element" based on the requirement, so that the tip can be replaced as it is worn or different function is needed, and the tip of different materials (not limit to a single material) and sizes can be used. Besides, in one embodiment of the present invention, the material of the tip is single crystal diamond, so that the thermal probe has the properties of high hardness, conductivity and duration. Thus, the tip can not be worn easily, so that the cost for the thermal probe can be reduced. Moreover, since the material of the pinpoint of the customized thermal probe has poor conductivity, the heating temperature of the customized thermal probe can not be increased and the pinpoint thereof is short and small. Thus, the heat generated by the heater is always lost during the conduction. The tip made of single crystal diamond can totally solve this problem.

BRIEF DESCRIPTION OF THE DRAWINGS

The invention will become more fully understood from the detailed description and accompanying drawings, which are given for illustration only, and thus are not limitative of the present invention, and wherein.

DETAILED DESCRIPTION OF THE INVENTION

The present invention will be apparent from the following detailed description, which proceeds with reference to the accompanying drawings, wherein the same references relate to the same elements.

Figure 1:
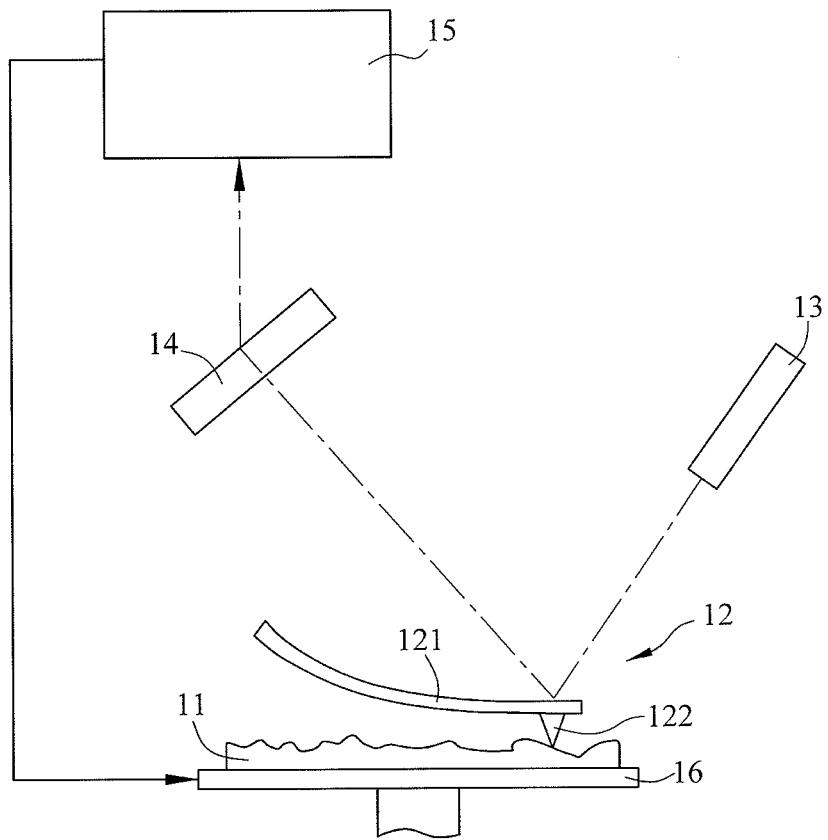
FIG. 1 is a schematic diagram showing a scanning probe to detect a sample surface.
Figure 2A:
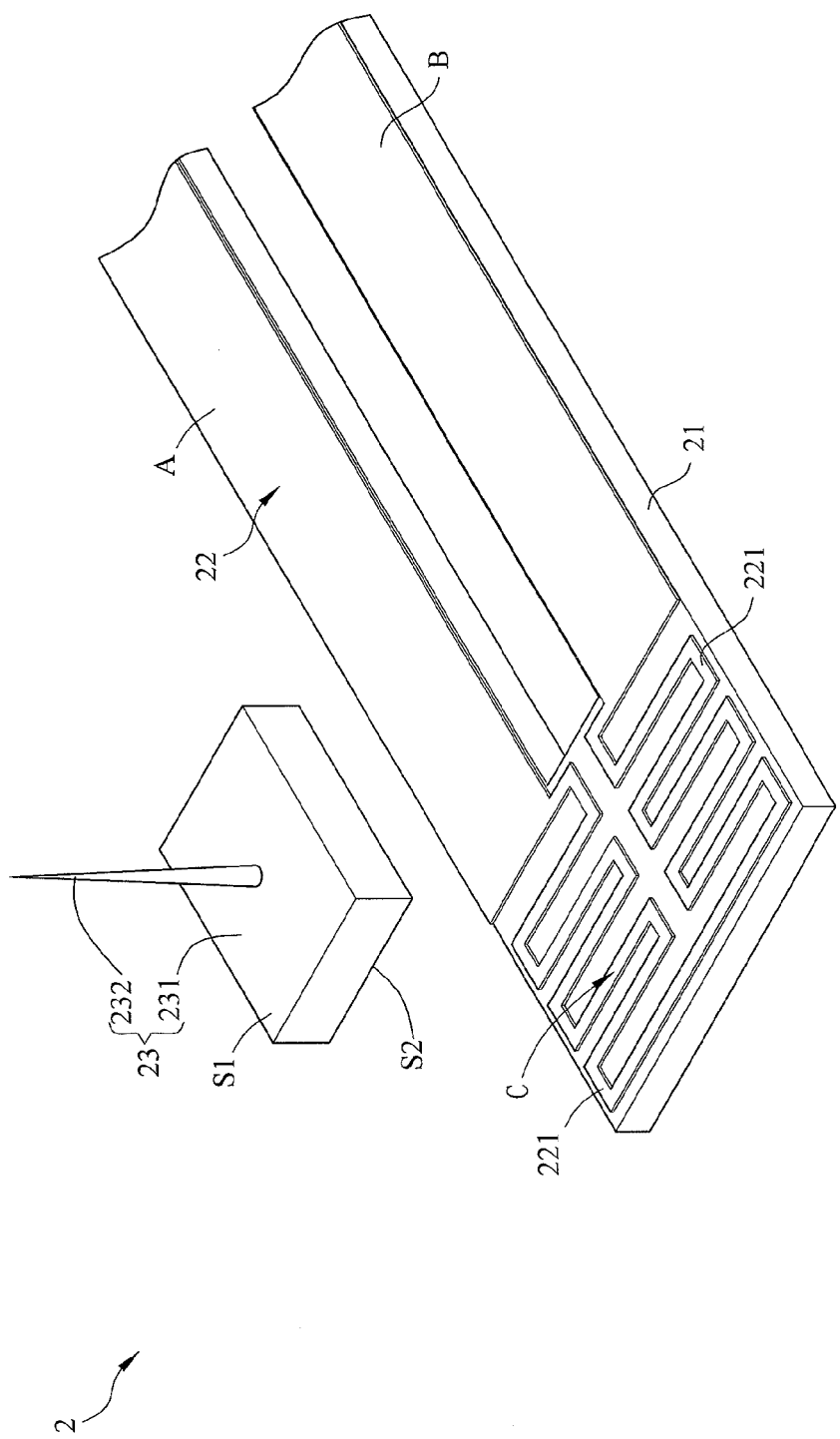
FIGS. 2A to 2C are an exploded view, an assembled view and a side view of a thermal probe according to an embodiment of the present invention.
Figure 2B:
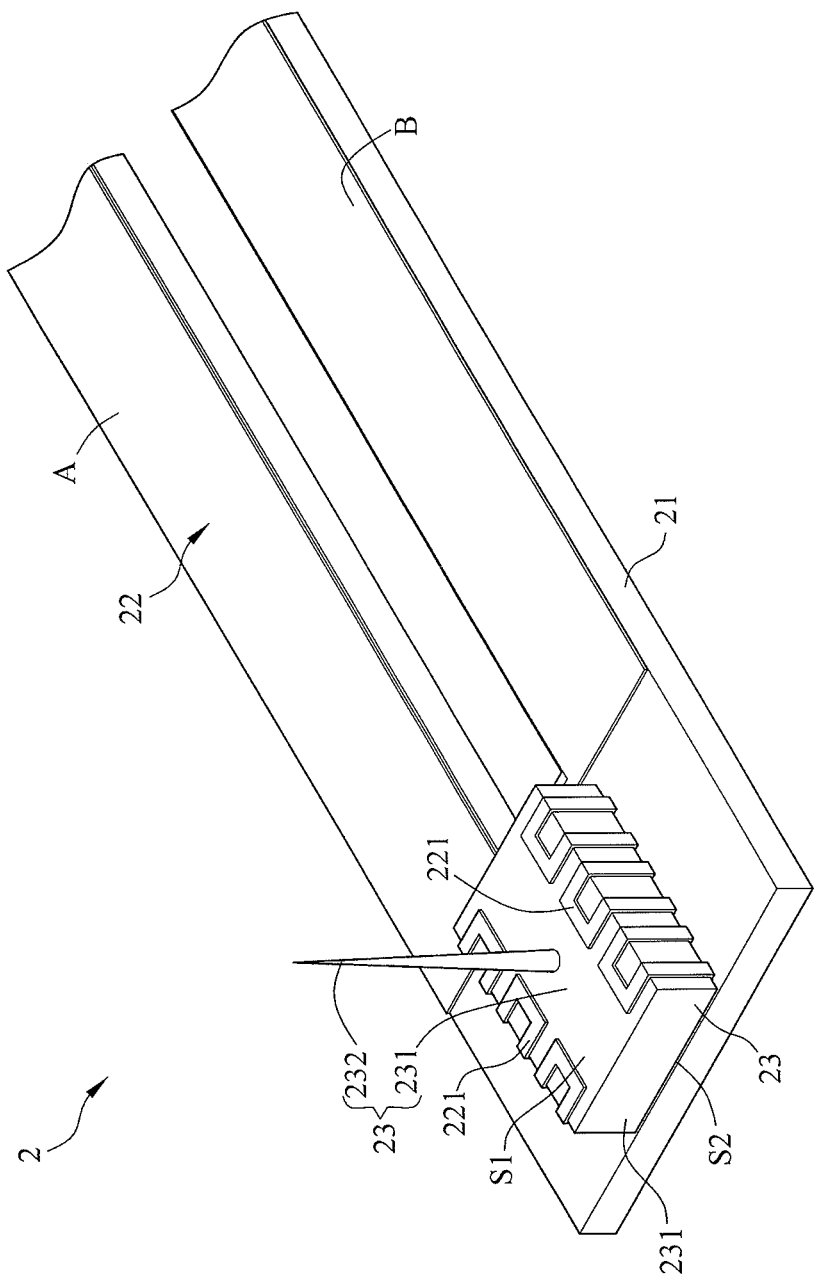
Figure 2C:
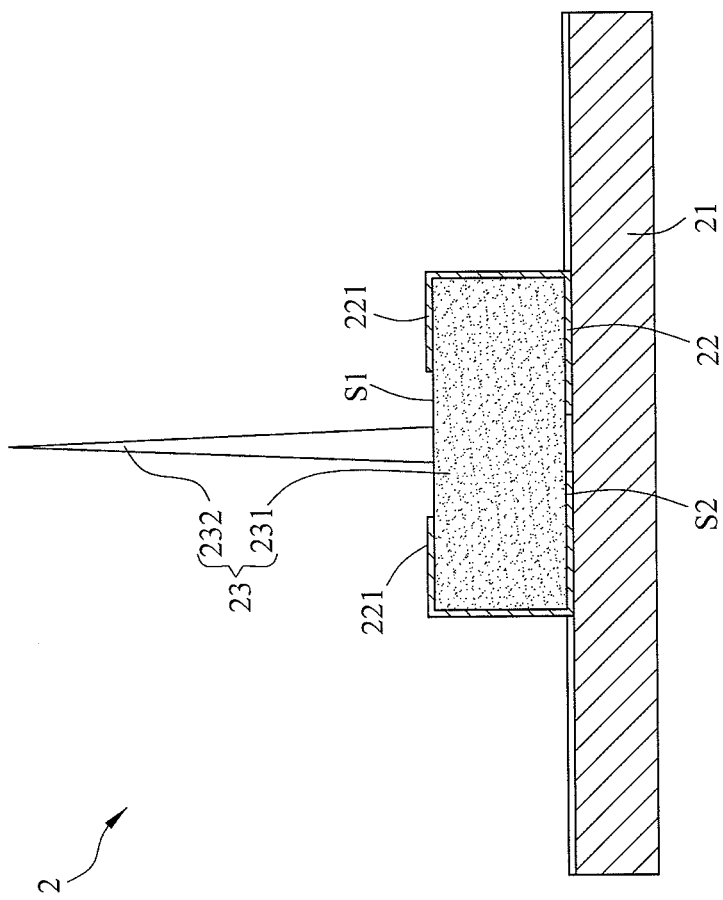

FIGS. 2A to 2C are an exploded view, an assembled view and a side view of a thermal probe 2 according to an embodiment of the present invention. The thermal probe 2 of the present invention can be applied to the thermal analyzing of micro-electronic elements, the thermal mapping of non-homogeneous materials, data storage, near-field photothermal microspectroscopy, localized heating, and the processing and modifying of micro-nano structures. The applicable fields of the thermal probe of the present invention are not limited. The thermal probe 2 includes a support element 21, a conductive pattern 22 and a tip 23.

The material of the support element 21 includes silicon, such as monocrystalline silicon. The size of the support element 21 is, for example but not limited to, 450×60×4 μm or 350×60×3 μm. Of course, the user can design and manufacture the support element 21 of different sizes depending on the requirement. The support element 21 can be manufactured by photolithography process (semiconductor processes), which may include photoresist coating, lithography, etching and removing photoresist steps. Since the photolithography process is well known, the details thereof will be omitted. In this embodiment, the support element 21 has two separate support arms A and B for example. The separate support arms A and B have a gap therebetween, so the air in the gap can prevent the heat energy loss through thermal conduction.

To be noted, the shape of the support element 21 is not limited to that shown in FIGS. 2A and 2B. Of course, the support element 21 with different shapes can be used depending on the requirement of user. For example, the support element may have a single support arm (not shown) instead of the separate support arms A and B as shown in FIGS. 2A and 2B. However, if a single support arm is used, the conductive patterns 22 on the support arm can not electrically coupled to each other.

The conductive pattern 22 is disposed on the support element 21 and has a plurality of bending portions 221 for forming a heating area C. In this case, the heating area C is defined as the portion of the conductive pattern 22 where the base 231 of the tip 23 is disposed. The material of the conductive pattern 22 may include Ni—P alloy, tungsten, platinum, carbon, Ni—Cr alloy, metal oxide (e.g. PbO or $RuO_2$), metal nitride (e.g. TaN), silicon (formed by ion implantation for providing resistance property), or any material with limited conductivity (or resistance). Accordingly, the user can design the length, width and thickness of the metal line of the conductive pattern 22 within the heating area C depending on the requirement, so as to adjust the resistance value of the conductive pattern 22. After applying the current to the conductive pattern 22, the heating area C can generate joule heat for heating the tip 23. In this embodiment, the material of the conductive pattern 22 comprises Ni—P alloy for example.

Figure 2D:
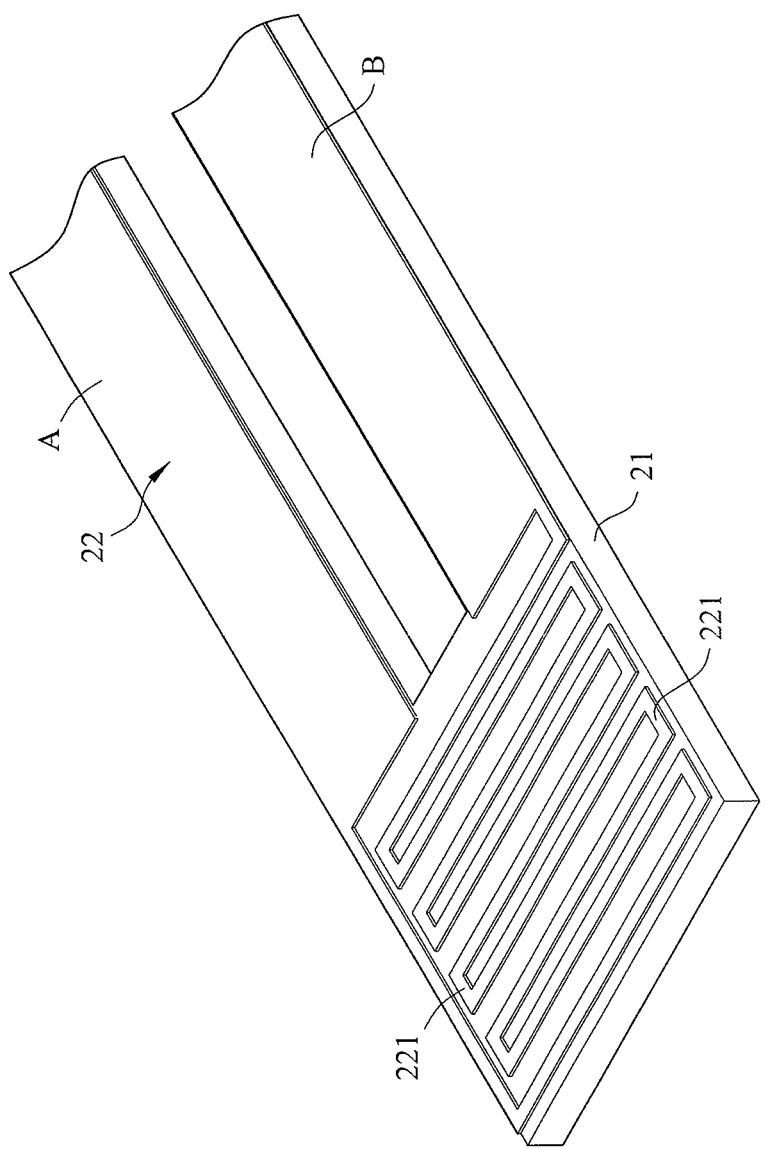
FIG. 2D is a schematic diagram showing a conductive pattern of the present invention.
Figure 3A:
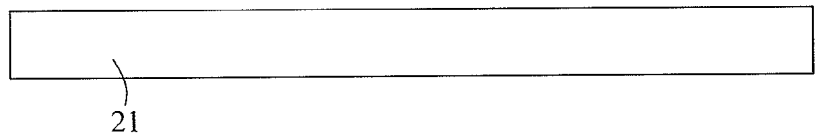
FIGS. 3A to 3E are schematic diagrams of manufacturing the conductive pattern of the present invention.
Figure 3B:
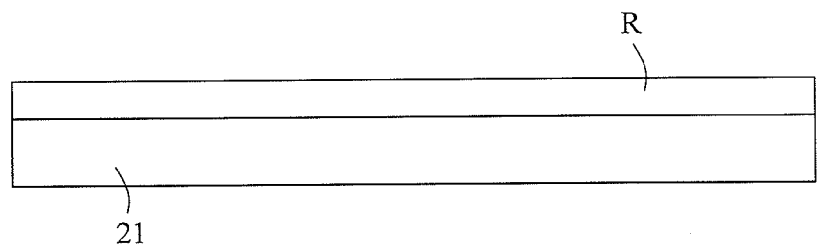
Figure 3C:
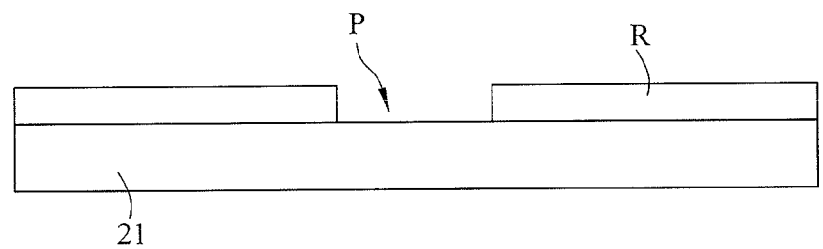
Figure 3D:
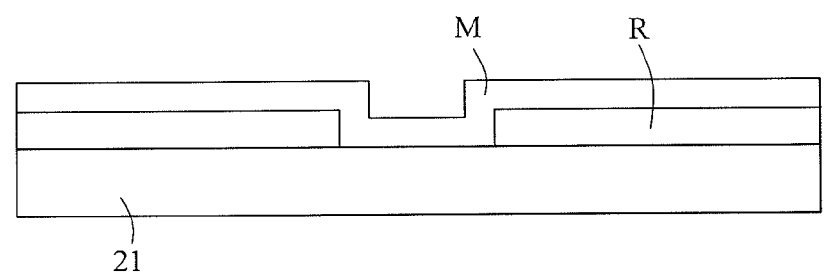
Figure 3E:
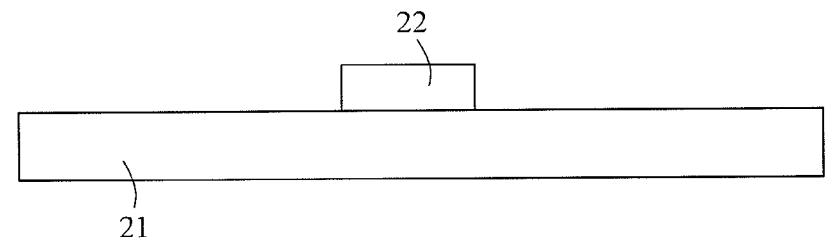

As shown in FIGS. 2A and 2B, the width of the conductive patterns 22 of the support arms A and B is, for example but not limited to, 15 μm, and the width of the bending portion 221 of the conductive pattern 22 is, for example but not limited to, 3 μm. Of course, the user can design and manufacture the conductive pattern 22 with different widths depending on the requirement. The conductive pattern 22 shown in FIG. 2A is for illustration only and, of course, the conductive pattern 22 can be other pattern such as that shown in FIG. 2D.

The manufacturing process of the conductive pattern 22 of the present invention will be described hereinafter with reference to FIGS. 3A to 3E.

The manufacturing method of the conductive pattern 22 may include the following steps of: providing a supporting element 21 (see FIG. 3A); coating a photo-resist layer R on the support element 21 (see FIG. 3B); forming a pattern P by a photolithography process (see FIG. 3C); forming a metal layer M (see FIG. 3D); and removing the photo-resist layer R and a part of the metal layer M out of the pattern P so as to form the conductive pattern 22. In this embodiment, the metal layer M is formed by electroless plating, and a metal lift-off process is performed to remove the undesired part of the metal layer M. The remained part of the metal layer M is the desired metal line (conductive pattern 22). The advantage of the electroless plating process is not need to dispose the conductive layer in advance (the conventional plating process needs to dispose a conductive layer in advance). The lift-off process is to use the solvent to remove the photoresist layer R, and the part of the metal layer M not covered by the photoresist layer R is remained. Besides, the materials deposited on the photoresist layer R are removed so as to form the desired conductive pattern 22. Of course, the conductive pattern 22 can also be manufactured by other methods such as plating, evaporating, or sputtering.

Referring to FIGS. 2A to 2C, the tip 23 has a base 231 and a pinpoint 232. The base 231 and the pinpoint 232 can be integrally formed as one piece or separate components. Besides, the base 231 has a first surface S1 and a second surface S2 opposite to each other, and the pinpoint 232 is disposed at the first surface S1 of the base 231. The material of the tip 23 may include diamond, TiN, $Si_3N_4$, SiC, or non-conductive ceramic, polymer, complex compound, or their combinations. The above-mentioned materials all have high hardness, thermal conductivity and duration. Thus, the user can select the proper material to manufacture the tip 23 of the thermal probe 2 according to the requirement, and the tips 23 of different materials and sizes can be applied to the thermal probe 2. In this embodiment, the base 231 and the pinpoint 232 are integrally formed as one piece, and are made of single crystal diamond, which has the superior properties of high hardness, thermal conductivity and duration. Since the material of the pinpoint of the customized thermal probe has poor conductivity, the heating temperature of the customized thermal probe can not be increased and the pinpoint thereof is short and small. Thus, the heat generated by the heater is always lost during the conduction. The tip 23 made of single crystal diamond can totally solve this problem. Besides, the material of the tip 23 is not limited to the above-mentioned examples. For example, the conductive pattern 22 of the thermal probe 2 may have heating ability for melting the meltable material of the tip 23, so that the thermal probe 2 can be used as a nano- or micro-scaled hot-glue gun or spot welding gun.

Referring to FIGS. 2B and 2C, the tip 23 is disposed over the conductive pattern 22, so that the second surface S2 of the base 232 is connected to the conductive pattern 22, while the bending portions 221 of the conductive pattern 22 are contact with the first surface S1. In this case, the bending portions 221 of the conductive pattern 22 are used as the supporting stage of the tip 23 for clipping (fixing) the tip 23. Due to the malleability of the conductive pattern 22, it is possible to use a scan electronic microscope and micro robot arm to bend the bending portions 221 of the conductive pattern 22 so as to press on the tip 23, thereby fixing the tip 23 by the bending portions 221. Thus, the tips 23 of different materials and sizes can be used and disposed on the conductive pattern 22. When the old tip 23 needs to be replaced due to wearing or different function, it is possible to replace it with another tip rather than replacing the entire thermal probe 2. Consequently, the cost for the thermal probe 2 can be reduced. In addition, the thermal probe 2 of the present invention can select the optimum combination of "tip, conductive pattern and support element" based on the requirement, so that the tip 23 can be replaced as it is worn or different function is needed, and the tip of different materials (not limit to a single material) and sizes can be used.

To be noted, the conductive pattern 22 may be contact with the pinpoint 232 or not contact with it. If the conductive pattern 22 is contact with the pinpoint 232, the heating rate of the pinpoint 232 can be increased so as to reduce the heating time of the tip 23.

The thermal probe 2 may further include an adhesive layer (not shown) disposed on the first surface S1 and/or the second surface S2, and is located between the conductive pattern 22 and the tip 23. Accordingly, the conductive pattern 22 and the support element 21 can be firmly connected by the adhesive layer. For example, the adhesive layer can be a quick glue (Cyanoacrylate) or epoxy resin.

Figure 4B:
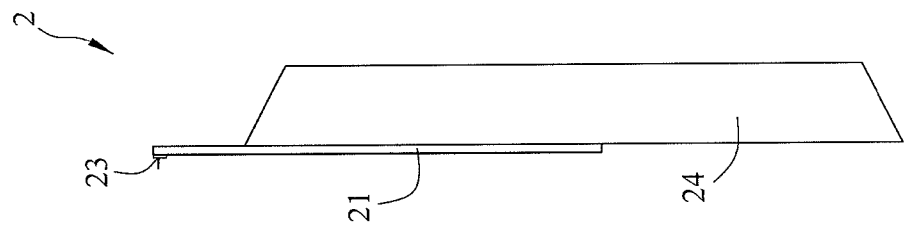
FIGS. 4A and 4B are other schematic diagrams of the thermal probe of the present invention.
Figure 4A:
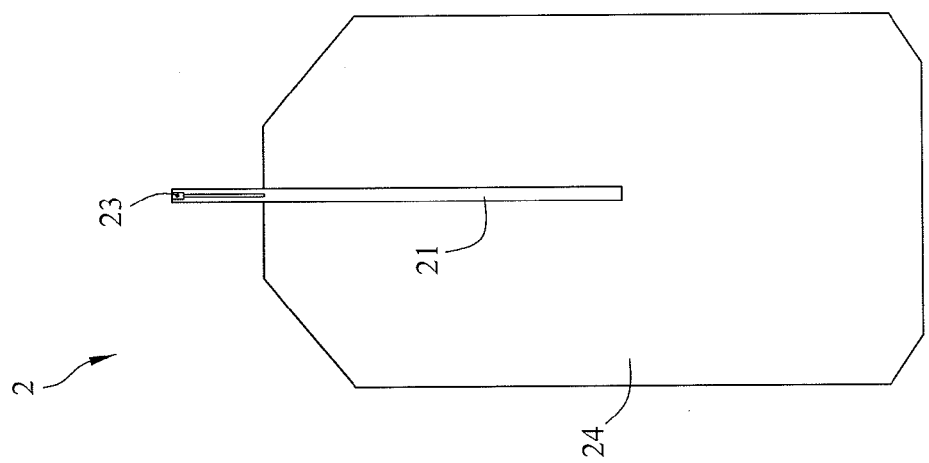

FIGS. 4A and 4B are other schematic diagrams of the thermal probe 2 of the present invention. With reference to FIGS. 4A and 4B, the thermal probe 2 further includes a pedestal 24. The support element 21 is disposed on and protrudes from the pedestal 24, and the tip 23 is located on one end of the support element 21 away from the pedestal 24. In this case, the pedestal 24 and the support element 21 can be integrally formed as one piece, and the material of the pedestal 24 may include silicon.

As mentioned above, the length, width and thickness of the metal line of the conductive pattern 22 within the heating area C can be different so as to adjust the resistance value of the conductive pattern 22. After applying the current to the conductive pattern 22, the heating area C can generate joule heat for heating the tip 23. In addition, due to the malleability of the conductive pattern 22, it is possible to bend the bending portions 221 of the conductive pattern 22 so as to press on and contact the tip 23, thereby fixing the tip 23 by the bending portions 221. Thus, the tips 23 of different materials and sizes can be used and disposed on the conductive pattern 22. When the old tip 23 needs to be replaced due to wearing or different function, it is possible to replace it with another tip rather than replacing the entire thermal probe 2. Consequently, the cost for the thermal probe 2 can be reduced. In addition, the thermal probe 2 of the present invention can select the optimum combination of "tip, conductive pattern and support element" based on the requirement, so that the tip 23 can be replaced as it is worn or different function is needed, and the tip of different materials (not limit to a single material) and sizes can be used.

To sum up, the thermal probe of the present invention includes a support element, a conductive pattern and a tip, the conductive pattern is disposed on the support element and has a plurality of bending portions, the tip has a base and a pinpoint, the base has a first surface and a second surface opposite to each other, the pinpoint is disposed on the first surface, the second surface is connected with the conductive pattern, and the bending portion are contact with the first surface. Accordingly, the bending portions of the conductive pattern can fix the tip, and the length, width and thickness of the metal line of the conductive pattern within the heating area can be modified to adjust the resistance value of the conductive pattern. After applying the current to the conductive pattern 22, the heating area C can generate joule heat for heating the tip 23. Thus, the thermal probe of the present invention can be applied to scanning probe microscopy and other related fields.

In addition, the thermal probe of the present invention can select the optimum combination of "tip, conductive pattern and support element" based on the requirement, so that the tip can be replaced as it is worn or different function is needed, and the tip of different materials (not limit to a single material) and sizes can be used. Besides, in one embodiment of the present invention, the material of the tip is single crystal diamond, so that the thermal probe has the properties of high hardness, conductivity and duration. Thus, the tip can not be worn easily, so that the cost for the thermal probe can be reduced. Moreover, since the material of the pinpoint of the customized thermal probe has poor conductivity, the heating temperature of the customized thermal probe can not be increased and the pinpoint thereof is short and small. Thus, the heat generated by the heater is always lost during the conduction. The tip made of single crystal diamond can totally solve this problem.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:
1. A thermal probe comprising:
 a support element;
 a conductive pattern disposed at the support element and having a plurality of bending portions; and
 a tip having a base and a pinpoint, wherein the base has a first surface and a second surface opposite to the first surface, the pinpoint is disposed at the first surface, the second surface is connected with the conductive pattern, and the bending portions are contacted with the first surface.

2. The thermal probe of claim 1, wherein the material of the support element comprises silicon.

3. The thermal probe of claim 1, wherein the material of the conductive pattern comprises Ni—P alloy, tungsten, platinum, carbon, Ni—Cr alloy, metal oxide, metal nitride, or silicon.

4. The thermal probe of claim 1, wherein the material of the tip comprises diamond, TiN, $Si_3N_4$, SiC, ceramic, polymer, complex compound, or their combinations.

5. The thermal probe of claim 1, wherein the base and the pinpoint are integrally formed as one piece.

6. The thermal probe of claim 1, wherein the tip is replaceable.

7. The thermal probe of claim 1, wherein the pinpoint is contact or non-contact with the conductive pattern.

8. The thermal probe of claim 1, wherein the conductive pattern is made by the following steps of:
- coating a photo-resist layer on the support element;
- forming a pattern by a photolithography process;
- forming a metal layer; and
- removing the photo-resist layer and a part of the metal layer out of the pattern so as to form the conductive pattern.

9. The thermal probe of claim 1, further comprising:
- an adhesive layer disposed on the first surface and/or the second surface.

10. The thermal probe of claim 1, further comprising:
- a pedestal, wherein the support element is disposed on and protrudes from the pedestal, and the tip is located on one end of the support element away from the pedestal.

* * * * *